United States Patent [19]

Polizzotto

[11] Patent Number: 4,907,405
[45] Date of Patent: Mar. 13, 1990

[54] PROCESS TO COOL GAS

[75] Inventor: Robert J. Polizzotto, East Amherst, N.Y.

[73] Assignee: Union Carbide Corporation, Danbury, Conn.

[21] Appl. No.: 300,914

[22] Filed: Jan. 24, 1989

[51] Int. Cl.⁴ .............................................. F02C 6/18
[52] U.S. Cl. ............................... 60/39.02; 60/39.07; 60/39.182; 62/323.2
[58] Field of Search ............... 60/39.02, 39.07, 39.182, 60/728, 39.33; 62/323.1, 323.2, 238.1

[56] References Cited

U.S. PATENT DOCUMENTS

| | | | |
|---|---|---|---|
| 2,322,717 | 6/1943 | Nettel | 60/728 |
| 2,339,185 | 1/1944 | Nettel | 60/728 |
| 2,548,508 | 4/1951 | Wolfner | 60/728 |
| 3,394,555 | 1/1968 | La Fleur | 62/29 |
| 3,796,045 | 3/1974 | Foster-Pegg | 60/39.02 |
| 4,424,668 | 11/1984 | Mukherjee | 60/39.182 |
| 4,793,132 | 12/1988 | Okabe | 60/39.182 |
| 4,841,722 | 6/1989 | Bjorge | 60/39.182 |

OTHER PUBLICATIONS

Air Conditioning and Refrigeration, B. H. Jennings, S. R. Lewis, International Textbook Company, 4th Edition, pp. 558–563 (1958).

Primary Examiner—Louis J. Casaregola
Attorney, Agent, or Firm—Stanley Ktorides

[57] ABSTRACT

A process which effectively uses steam produced by a cogeneration facility to cool gas wherein the steam is passed through an absorption chiller to cool water which in turn is used to cool the gas.

18 Claims, 1 Drawing Sheet

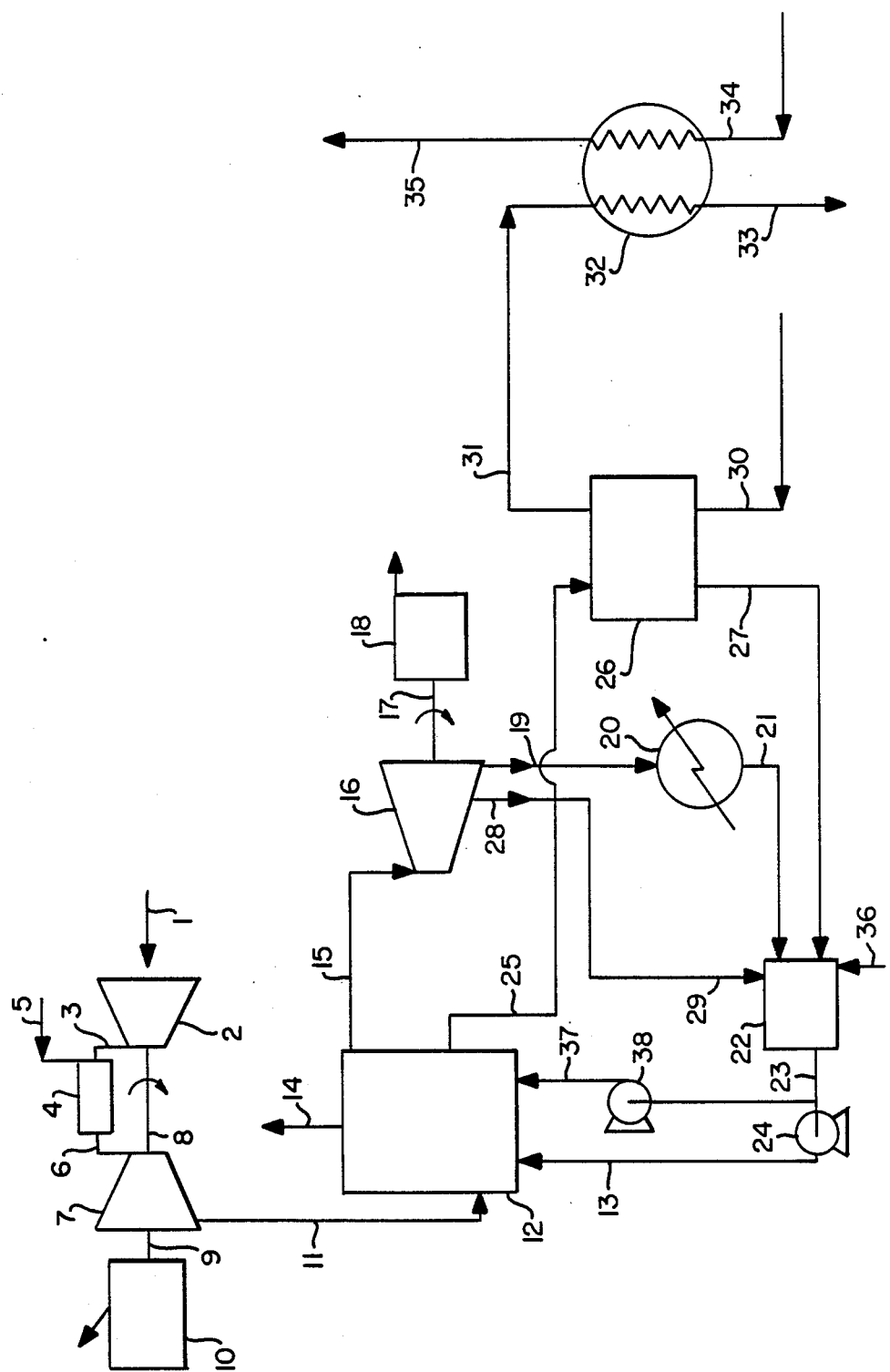

PROCESS TO COOL GAS

TECHNICAL FIELD

The invention relates generally to the field of cogeneration wherein work and steam are produced, and more particularly is an improvement wherein steam is used to refrigerate a gas.

BACKGROUND ART

The liquefaction of a gas is a very energy intensive process, especially where the gas has a boiling point significantly below atmospheric temperatures. Such gases include air, nitrogen, oxygen and argon. The liquefaction of such gas can be facilitated by cooling the gas prior to liquefaction. Of course, such cooling also requires a significant expenditure of energy.

A method of generating energy and thus producing work which is receiving increased attention and employment is cogeneration. Cogeneration is a method wherein fuel and oxidant are combusted to produce both electricity and steam by passing the combustion products through a gas turbine and a waste heat steam generator.

While it is known to employ electricity from a cogeneration facility to supply cooling to a gas, such use is undesirable because of the many other uses to which such electricity could be applied.

Accordingly it is desirable to have a process to efficiently employ low pressure steam generated by a cogeneration facility to cool gas, especially a gas which is to be liquefied at cryogenic temperatures.

Therefore it is an object of this invention to provide a process which will enable the use of low pressure steam generated by a cogeneration facility to cool gas, especially gas intended for liquefaction.

SUMMARY OF THE INVENTION

The above and other objects which will become apparent to one skilled in the art upon a reading of this disclosure are attained by the present invention which is:

Process to cool gas comprising:

(A) combusting fuel and oxidant to produce elevated pressure hot gas;

(B) expanding elevated pressure hot gas through a gas turbine for the production of external work;

(C) passing expanded hot gas in heat exchange relation with elevated pressure water to produce high pressure steam and low pressure steam;

(D) passing low pressure steam through an absorption chiller to cool liquid; and (E) passing cooled liquid in indirect heat exchange relation with gas to cool the gas.

As used herein, the term "gas turbine" means a mechanical device whereby gas at an elevated pressure and temperature is directed at blades attached to a shaft and the resulting force produces rotational motion and available shaft energy.

As used herein, the term "steam turbine" means a mechanical device whereby steam at an elevated pressure and temperature is directed at blades attached to a shaft and the resulting force produces rotational motion and available shaft energy.

As used herein, the term "cryogenic gas" means a gas having a normal boiling point below about 150° K.

As used herein, the term "direct heat exchange" means the bringing of two fluids into heat exchange relation with physical contact or intermixing of the fluids with each other.

As used herein, the term "indirect heat exchange" means the bringing of two fluids into heat exchange relation without any physical contact or intermixing of the fluids with each other.

As used herein, the term "absorption chiller" means a refrigeration device utilizing a recirculating refrigerant such as ammonia or water, another fluid, such as lithium bromide or water, capable of forming a solution with the refrigerant, and a heat source that provides the function of the refrigerant compressor. The refrigerant evaporates at low pressure to provide the refrigeration, then is absorbed into solution at the low pressure, then the solution is pumped to a high pressure, then the heat source (such as steam) drives the refrigerant from solution to provide high pressure vapor refrigerant, then the vapor refrigerant is condensed (as by cooling water), and the high pressure condensed liquid refrigerant is valve expanded to the low pressure to complete the refrigeration cycle. For further discussion of absorption refrigeration see *Air Conditioning And Refrigeration*, Jennings and Lewis, International Textbook Company, 4th Edition, pp. 558–563.

As used herein, the term "external work" means energy that is produced by a device and capable of use outside the boundaries of the device.

The term, "column", as used herein means a distillation of fractionation column or zone, i.e., a contacting column or zone wherein liquid and vapor phases are countercurrently contacted to effect separation of a fluid mixture, as for example, by contacting of the vapor and liquid phases on a series of vertically spaced trays or plates mounted within the column or alternatively, on packing elements with which the column is filled. For a further discussion of distillation columns, see the Chemical Engineers' Handbook. Fifth Edition, edited by R. H. Perry and C. H. Chilton, McGraw-Hill Book Company, New York, Section 13, "Distillation" B. D. Smith et al., page 13-3 *The Continuous Distillation Process*. The term, double column, is used to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

BRIEF DESCRIPTION OF THE DRAWING

The sole FIGURE is a schematic flow diagram of one preferred embodiment of the process of this invention.

DETAILED DESCRIPTION

The process of this invention will be described in detail with reference to the FIGURE.

Referring now to the FIGURE, oxidant 1 which may be air, technically pure oxygen, or oxygen-enriched air, is passed through compressor 2 and compressed to a pressure within the range of from 100 to 275 pounds per square inch absolute (psia). The compressed oxidant 3 is passed into combustion zone 4. Also passed into combustion zone 4 is fuel 5 which may be any suitable gaseous or liquid fuel. Among such suitable fuels one can name natural gas, butane, propane, distillant oil, jet aviation fuel, and oil refinery by-product fuels.

Within combustion zone 4 the fuel and oxidant is combusted to produce elevated pressure hot gas generally at a temperature which exceeds 1500° F. and at a pressure within the range of from 100 to 275 psia. The elevated pressure hot gas is passed through gas turbine 7 wherein external work is produced. As illustrated in the FIGURE, such external work could include the direct drive through shafts 8 and 9 to power compressor 2 and electric generator 10 respectively. Hot gas 11 which has been expanded to a lower pressure through gas turbine 7 is removed from gas turbine 7 and passed to waste heat steam generator 12 wherein it is passed in heat exchange relation with elevated pressure water 13 and 37 provided into waste heat steam generator 12. Elevated pressure water 13 is at a high pressure generally exceeding 150 psia and elevated pressure water 37 is at a lower pressure than the pressure of water 13 and at a pressure generally exceeding 15 psia. The heat exchange within waste heat steam generator 12 between hot gas 11 and the elevated pressure water results in the production of high pressure steam and low pressure steam. The resulting cooled gas 14 is passed out of waste heat steam generator 12.

Exhaust hot gases from the gas turbine line 11 pass into the waste heat steam generator 12 over a series of high pressure heat exchangers and boiler drums against the elevated pressure water 13. The hot gases cause steam to be produced in this first series of heat exchangers. The hot gases, now somewhat cooled, pass over a second series of heat exchangers and boiler drums against the lower pressure water 37. The hot gases cause steam to be produced but at a lower pressure. The hot gases, now further cooled, pass out the exhaust stack of the waste heat steam generator to the atmosphere.

High pressure steam 15, generally at a temperature within the range of from 400° F. to 750° F. and at a pressure within the range from 150 to 650 psia, is passed out of waste heat steam generator 12 and is gainfully employed. For example, the high pressure steam could be used directly in a paper mill or oil refinery. Alternatively, as illustrated in the FIGURE, the high pressure steam could be passed through steam turbine 16 wherein external work is produced. Such external work could include the direct drive through shaft 17 to power electric generator 18. Steam 19 which has been expanded by complete traverse of steam turbine 16 is passed to condenser 20 wherein it is condensed by indirect heat exchange with coolant and the resulting liquid water 21 passed through deareator 22 which operates in a conventional manner well known to those skilled in the art. A portion of deareated water 23 is pumped by pump 24 to form elevated pressure water 13 for use within waste heat steam generator 12.

Low pressure steam 25, generally at a temperature within the range of from 230° F. to 270° F. and at a pressure within the range of from 20 to 40 psia, is passed out of waste heat steam generator 12 and into absorption chiller 26. Absorption chillers are well known to those skilled in the art and are commercially available such as from Carrier Corp or Trane Corp (model ABSC-IIA).

Condensed liquid water 27 derived from low pressure steam 25 is passed out of absorption chiller 26 and through deareator 22 to form part of deareated water 23. The FIGURE illustrates a particularly preferred embodiment of the process of this invention wherein steam 28, which has been expanded by partial traverse of steam turbine 16, is passed to deareator 22 such as through line 29 and/or is combined with low pressure steam in line 25 and passed into absorption chiller 26. In the deareator, steam from line 29 mixes and condenses with water 21 from condenser 20 and make-up water provided to the deareator in line 36. The make-up water may be from any source such as city water. It is required in order to replenish steam losses from the cycle. A portion of deareated water 23 is pumped by pump 38 to a higher pressure to form stream 37. Stream 37, which is the water supply for the low pressure steam, is generally within the range of from about 10 to 25 percent of the total water supply to waste heat steam generator 12.

Liquid 30, is passed through absorption chiller 26 and is cooled, generally by at least 15° F. Preferably liquid 30 is water, which may be taken from any convenient source such as a cooling tower system. Liquid 30 may be any liquid which can remain liquid at the outlet of the absorption chiller.

The cooled water 31 is passed out of absorption chiller 26 and through heat exchanger 32 wherein it is warmed by indirect heat exchange with cooling gas. The warmed water 33 may be recycled to absorption chiller 26, combined with other cooling water circuits associated with cooling tower systems, or even discharged.

Gas 34 to be cooled may be from any convenient source. The process of this invention is particularly advantageous when gas 34 is a cryogenic gas. In such a case a preferred source of the cryogenic gas is an air separation plant, such as a single column or double column cryogenic air separation plant. Those skilled in the art are familiar with air separation plants in general as well as single column and double column cryogenic air separation plants. A particularly preferred gas to be cooled is nitrogen. When the source of the gas to be cooled is an air separation plant, it is particularly preferred that at least some of the electricity generated by electric generator 10 and/or electric generator 18, if such electric generators are employed, be used to operate the air separation plant. Generally the gas to be cooled will be available as pressurized gas from a liquefier associated with an air separation plant and may have been cooled prior to the additional cooling of the process of this invention. In addition, some of the oxygen produced by the air separation plant may be conveniently used as the oxidant for the combustion which takes place in combustion zone 4.

Gas 34 is cooled by passage through heat exchanger 32. Preferably, cooled gas 35 is then further cooled and condensed to liquid such as by passage through a liquefier. When the gas to be cooled is nitrogen from an air separation plant, the nitrogen will generally be at a pressure within the range of from 400 to 700 psia and at a temperature within the range of from 100° F. to 200° F., and will be cooled by passage through heat exchanger 32 to be within at least 20° F. and preferably within 5° F. of the absorption chiller outlet fluid temperature in line 31.

In Table I there is tabulated the results of a computer simulation of the process of this invention carried out in accord with the embodiment illustrated in the FIGURE. The stream numbers correspond to those of the FIGURE.

TABLE I

| Stream No. | Composition | Flowrate (Thousand Pounds Per Hour) | Temp. (°F.) | Pressure (psia) |
|---|---|---|---|---|
| 1 | AIR | 540 | 65 | 14.4 |
| 5 | NATURAL GAS | 10.7 | 200 | 450 |
| 6 | AIR AND COMBUSTION GASES | 550.7 | 2200 | 265 |
| 11 | AIR AND COMBUSTION GASES | 550.7 | 959 | 15.2 |
| 13 | WATER | 76 | 240 | 685 |
| 15 | STEAM | 67 | 720 | 665 |
| 19 | STEAM | 55 | 120 | 1.23 |
| 21 | WATER | 55 | 110 | 1.23 |
| 23 | WATER | 89 | 240 | 25 |
| 25 | STEAM | 12 | 260 | 35 |
| 27 | WATER | 18 | 240 | 25 |
| 28 | STEAM | 12 | 350 | 35 |
| 29 | STEAM | 6 | 300 | 25 |
| 30 | WATER | 475 | 65 | 45 |
| 31 | WATER | 475 | 40 | 40 |
| 33 | WATER | 475 | 60 | 35 |
| 34 | NITROGEN | 340 | 177 | 615 |
| 35 | NITROGEN | 340 | 45 | 610 |
| 36 | WATER | 10 | 60 | 25 |
| 37 | WATER | 13 | 240 | 45 |

Now by the use of the process of this invention one can effectively employ steam from a cogeneration facility to cool gas. Although the invention has been described in detail with reference to one specific embodiment, those skilled in the art will recognize that there are other embodiments of the invention within the spirit and scope of the claims.

I claim:

1. Process to cool gas comprising:
   (A) combusting fuel and oxidant to produce elevated pressure hot gas;
   (B) expanding elevated pressure hot gas through a gas turbine for the production of external work;
   (C) passing expanded hot gas in heat exchange relation with elevated pressure water to produce high pressure steam and low pressure steam;
   (D) passing low pressure steam through an absorption chiller to cool liquid; and
   (E) passing cooled liquid in indirect heat exchange relation with gas to cool the gas.

2. The process of claim 1 wherein the oxidant is compressed prior to the combustion of step (A).

3. The process of claim 1 wherein the oxidant is air.

4. The process of claim 1 wherein the oxidant is oxygen-enriched air.

5. The process of claim 1 wherein the oxidant is technically pure oxygen.

6. The process of claim 1 wherein the external work produced in step (B) produces electricity.

7. The process of claim 2 wherein work produced in step (B) is employed to carry out compression of the oxidant.

8. The process of claim 1 wherein the gas which undergoes cooling in step (E) is nitrogen.

9. The process of claim 1 further comprising pumping condensed exhaust from the adsorption chiller to form elevated pressure water of step (C).

10. The process of claim 1 further comprising condensing gas cooled in step (E) to form liquid.

11. The process of claim 1 wherein the gas to be cooled in step (E) is taken from an air separation plant.

12. The process of claim 11 wherein oxygen produced by the air separation plant forms at least some of the oxidant of step (A).

13. The process of claim 11 wherein at least some of the external work produced in step (B) produces electricity and at least some of this electricity is used to operate the air separation plant.

14. The process of claim 1 wherein the liquid cooled in step (D) is water.

15. The process of claim 1 further comprising passing high pressure steam through a steam turbine for the production of external work.

16. The process of claim 15 wherein the external work produced by the passage of high pressure steam through the steam turbine produces electricity.

17. The process of claim 15 further comprising passing some of the steam which passes through the steam turbine through the absorption chiller.

18. The process of claim 15 further comprising condensing exhaust from the steam turbine and pumping condensed exhaust to form elevated pressure water of step (C).

* * * * *